US012269290B2

(12) United States Patent
Villasenor Navarro

(10) Patent No.: US 12,269,290 B2
(45) **Date of Patent: *Apr. 8, 2025**

(54) ROLLER-TYPE APPLICATOR CLEANING APPARATUS

(71) Applicant: Jorge Adrian Villasenor Navarro, Kailua Kona, HI (US)

(72) Inventor: Jorge Adrian Villasenor Navarro, Kailua Kona, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,417

(22) Filed: Apr. 19, 2023

(65) Prior Publication Data

US 2023/0256772 A1 Aug. 17, 2023

Related U.S. Application Data

(63) Continuation of application No. 16/939,763, filed on Jul. 27, 2020, now Pat. No. 11,660,908.

(Continued)

(51) Int. Cl.

*B44D 3/00* (2006.01)
*B08B 3/04* (2006.01)
*B08B 3/06* (2006.01)

(52) U.S. Cl.

CPC .............. *B44D 3/006* (2013.01); *B08B 3/047* (2013.01); *B08B 3/06* (2013.01); *B08B 2220/04* (2013.01)

(58) Field of Classification Search

CPC ........... B08B 3/045; B08B 3/047; B08B 3/06; B44D 3/006

See application file for complete search history.

(56) References Cited

U.S. PATENT DOCUMENTS 2,831,488 A * 4/1958 Anderson .............. B44D 3/006 68/213
3,897,797 A * 8/1975 Wright ................... B44D 3/006 134/155

(Continued)

FOREIGN PATENT DOCUMENTS

DE 19825883 A1 * 12/1999 ............. B44D 3/006

OTHER PUBLICATIONS

Pamrick Enterprises LLC Clean N Roll, retrieved from Internet, retrieved on Jul. 27, 2020, <URL: https://pamrickenterprisesllc.com/ >.

(Continued)

*Primary Examiner* — Omair Chaudhri

(57) ABSTRACT

A roller-type applicator cleaning apparatus includes a lid, a housing, a water inlet valve, a base, a plurality of radial openings, and a central axis. The base includes a platform and an applicator holder. The lid, the housing, and the base are concentrically positioned along the central axis. The applicator holder is adjacently connected onto the platform and function as a storage space for the roller-type applicator. The plurality of radial openings laterally traverses through the applicator holder so that a flow of water can discharge into the applicator holder as the flow of water is entered into the housing through the water inlet. The lid and the base are oppositely positioned of each other about the housing and threadedly attached to the housing. The applicator holder is encircled by the housing so that the flow of water can fully engaged with the inserted applicator that needs to be cleaned.

8 Claims, 6 Drawing Sheets

Related U.S. Application Data

(60) Provisional application No. 62/878,488, filed on Jul. 25, 2019.

(56) References Cited

U.S. PATENT DOCUMENTS

| | | | | | |
|---|---|---|---|---|---|
| 4,517,699 | A | | 5/1985 | Petricka | |
| 5,050,626 | A | * | 9/1991 | Brockage | B44D 3/006<br>134/155 |
| 5,111,834 | A | * | 5/1992 | O'Brien | B44D 3/006<br>134/900 |
| 5,932,028 | A | | 8/1999 | Carrie et al. | |
| 5,935,342 | A | | 8/1999 | Boyd | |
| 6,695,164 | B1 | * | 2/2004 | Chayer | B44D 3/127<br>220/736 |
| 11,485,556 | B1 | * | 11/2022 | Brenner | A46B 17/06 |
| 2002/0166578 | A1 | | 11/2002 | Leblond | |
| 2013/0276836 | A1 | * | 10/2013 | Fahy | B44D 3/006<br>134/201 |
| 2015/0202660 | A1 | * | 7/2015 | Ciaschi | A46B 17/06<br>134/33 |
| 2015/0328657 | A1 | * | 11/2015 | Kenny, Jr. | B08B 3/04<br>134/198 |
| 2018/0147883 | A1 | * | 5/2018 | Burke | B44D 3/006 |
| 2019/0344205 | A1 | * | 11/2019 | Hicks | B08B 9/00 |

OTHER PUBLICATIONS

Home Right M C800369 Roller Cleaner and Handy Painters Tool, Colors May Vary, retrieved from Internet, retrieved on Jul. 27, 2020, <URL: https://www.amazon.com/Right-C800369-Roller-Cleaner-Painters/dp/B002R4YN7S>.

* cited by examiner

ROLLER-TYPE APPLICATOR CLEANING APPARATUS

The current application claims a priority to the U.S. Utility patent application Ser. No. 16/939,763 filed on Jul. 27, 2020. The current application is filed on Apr. 19, 2023.

FIELD OF THE INVENTION

The present invention relates generally to cleaning apparatus for roller-type applicators. More specifically, the present invention is a roller-type applicator cleaning apparatus for multiple different sizes of paint rollers and other similarly related objects.

BACKGROUND OF THE INVENTION

Currently, in present society, many people utilize roller-type applicators, like paint rollers, to paint their interior spaces in an efficient and timely manner. However, overtime, these paint rollers can accumulate paint on their surfaces, which can be hard to clean manually by hand under a running faucet. Usually, with the method described previously, the user would need to repeatedly wrench and squeeze the paint roller as it is being washed and cleaned. This method can be physically-tasking, time-consuming, inefficient, wasteful of water, and detrimental to the longevity of the paint roller in the long run. Although there are cleaning apparatuses for paint rollers and such, these cleaning apparatuses can be cumbersome to store and/or transport from one onsite location to another. Additionally, these cleaning apparatuses tend to consume more water than the method described previously because these cleaning apparatuses usually do not restrict the water to within the cleaning apparatuses. Instead, these cleaning apparatuses tend to utilize pressurized water that easily escape from within the cleaning apparatuses, which can require more volumes of water to replenish those that escape from the cleaning apparatuses. Finally, majority of these cleaning apparatuses only appear to be capable of facilitating a singular or a limited number of sizes of paint rollers; thus, forcing users to either buy wide quantities of different cleaning apparatus for different sizes paint rollers.

An objective of the present invention is to provide users with a device that can be a roller-type applicator cleaning apparatus. The present invention intends to provide users with a device that easily cleaning paint rollers and other similarly related objects in an efficient manner without making the cleaning process physically-tasking, time-consuming, and wasteful of water used in the cleaning process. The present invention includes one or more rubber gaskets to prevent leakage of water during the cleaning process. A plurality of radially positioned openings of the present invention redirects a flow of pressurized water that is supplied to the present invention onto the external surface of a paint roller or other similarly related objects. The present invention intends to provide users with a device that prolong the longevity of paint rollers and other similarly related objects. The present invention intends to provide users with a device that can accept multiple different sizes of paint rollers and other similar related objects.

DETAIL DESCRIPTIONS OF THE INVENTION

All illustrations of the drawings are for the purpose of describing selected versions of the present invention and are not intended to limit the scope of the present invention.

The present invention is a roller-type applicator cleaning apparatus so that the paint rollers and other similarly related objects can be effectively and easily clean without making the cleaning process physically-tasking, time-consuming, and wasteful of water. The present invention can be of any shape, size, material, features, type or kind, orientation, location, quantity, components, and arrangements of components that would allow the present invention to fulfill the objectives and intents of the present invention. However, it can be preferred that the present invention be of a material that is strong, durable, lightweight, easily manufacturable, easily cleanable, and/or water resistant or leak-proof. It can be preferred that the present invention be of a general size and/or shape similar to and/or compatible with the general size and/or shape of roller-type applicators like paint rollers and/or other similar objects.

Figure 1:
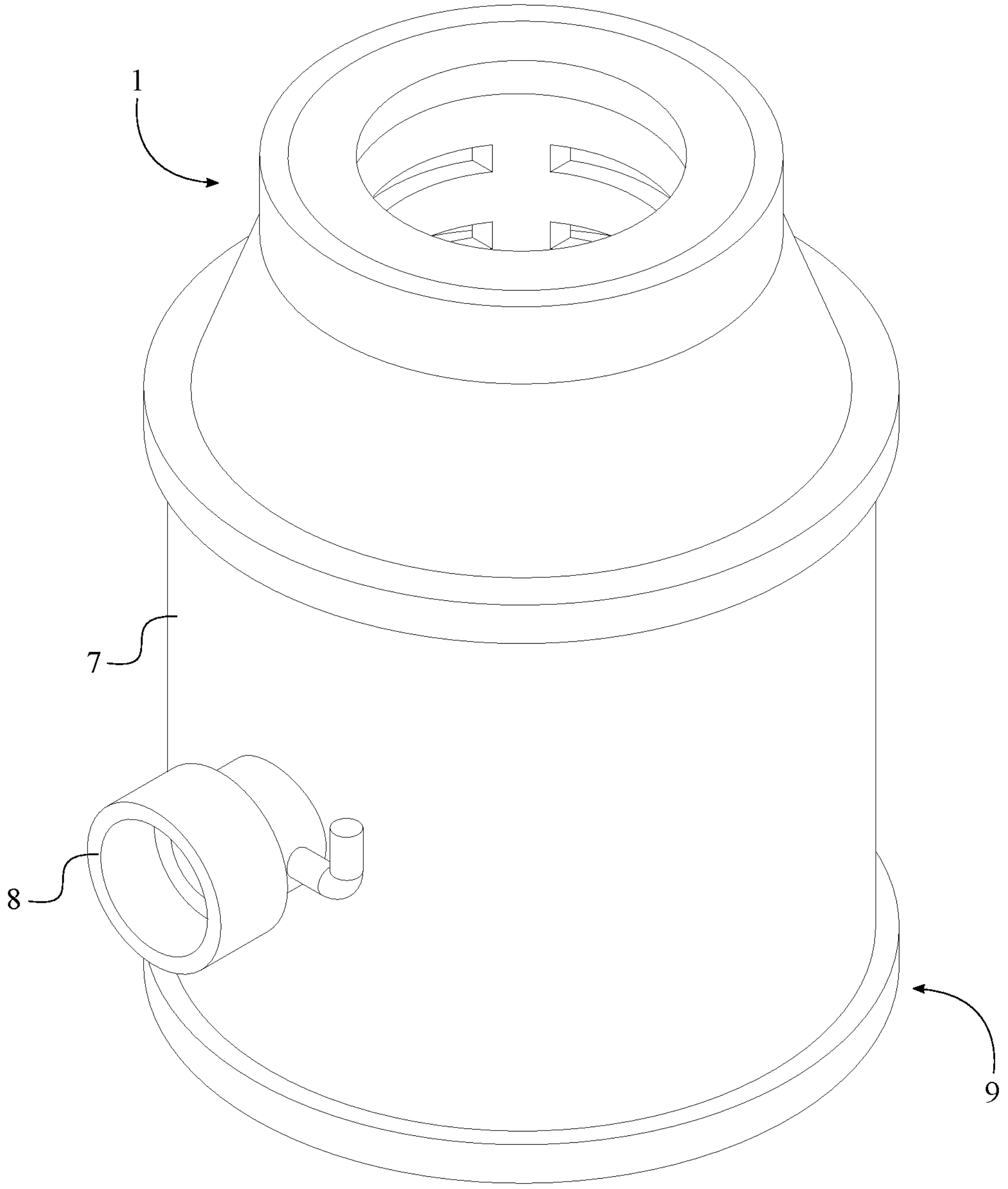
FIG. 1 is a perspective view of the present invention.
Figure 2:
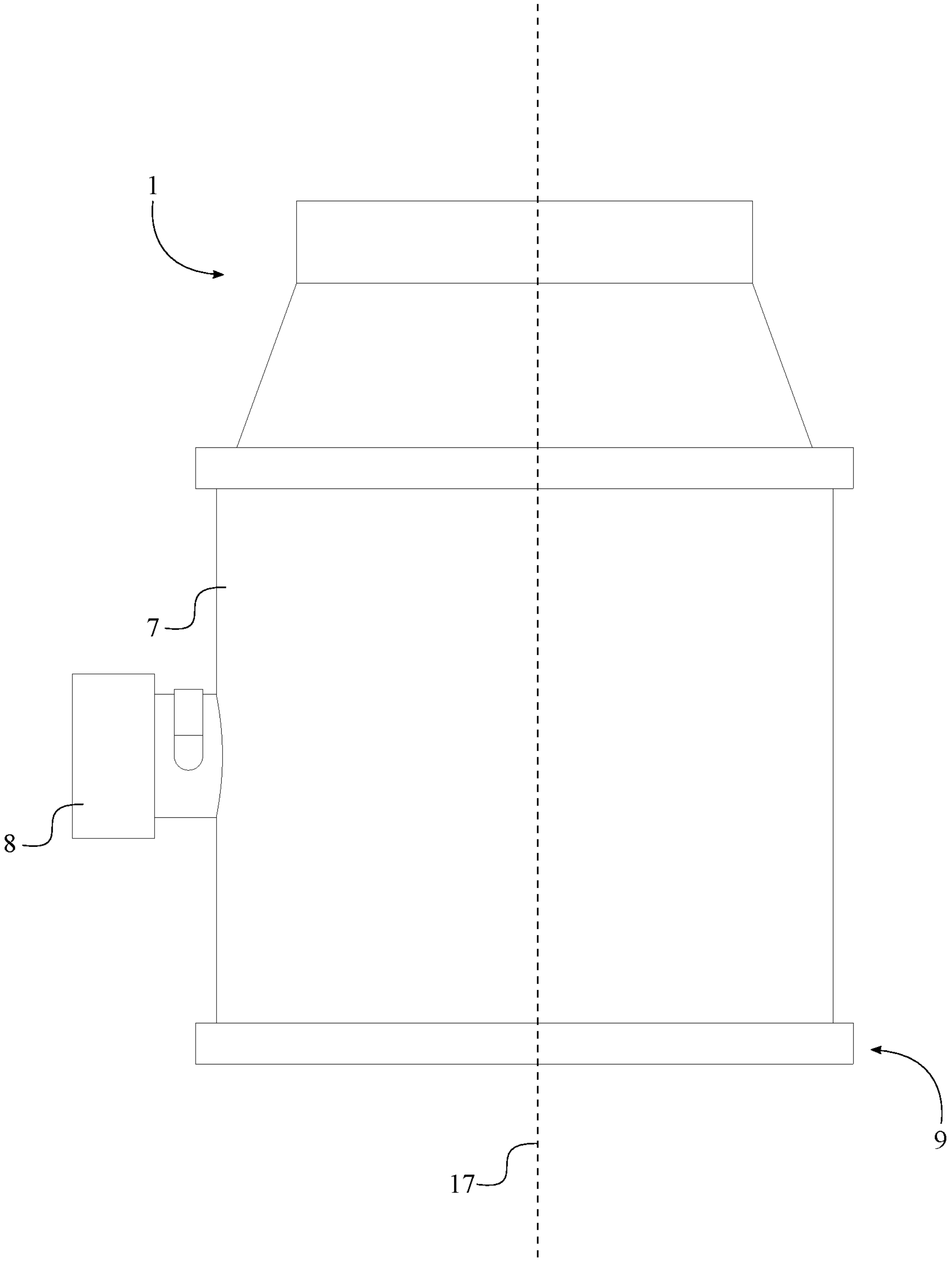
FIG. 2 is a side view of the present invention.
Figure 3:
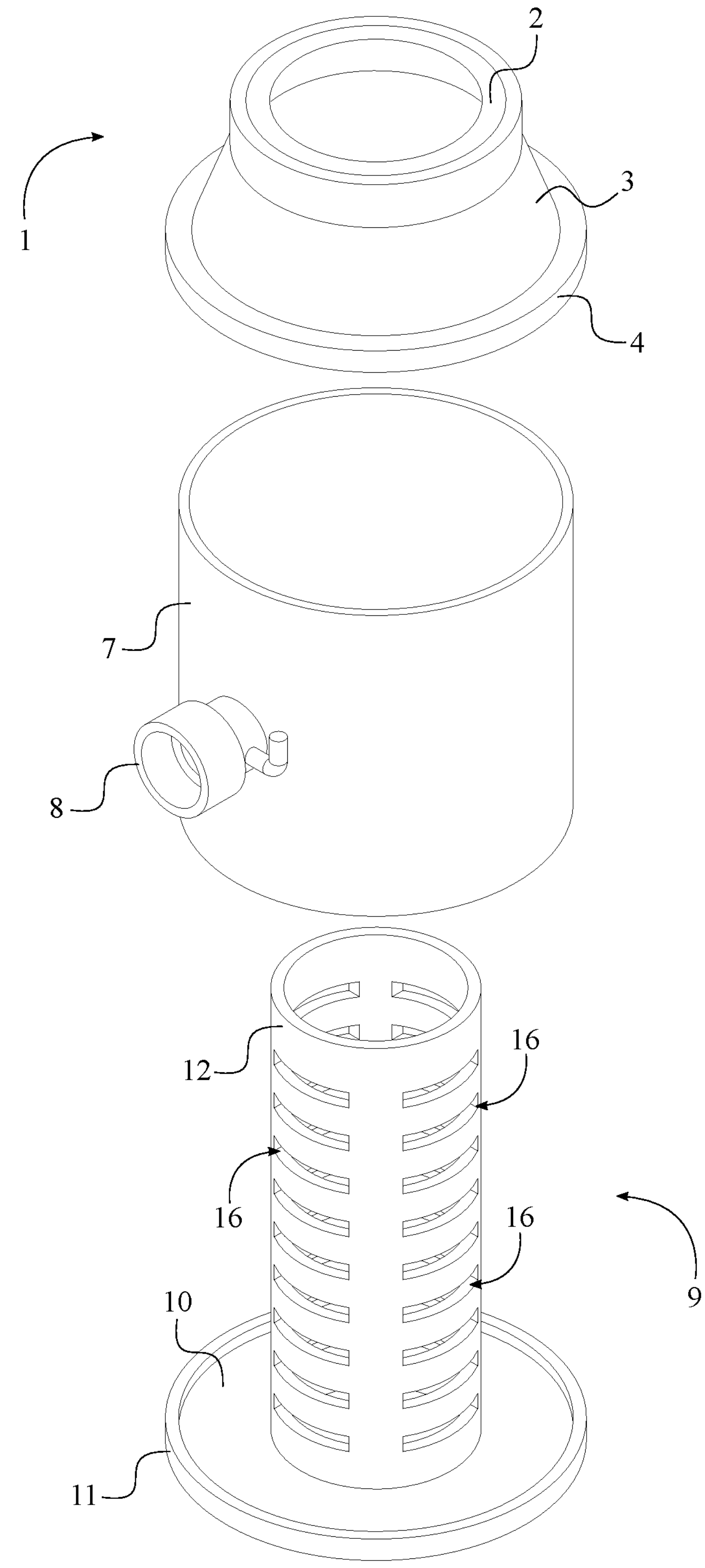
FIG. 3 is a perspective exploded view of the present invention.

The present invention comprises a lid 1, a housing 7, a water inlet valve 8, a base 9, a plurality of radial openings 16, and a central axis 17 as shown in FIG. 1-3. The base 9 comprises a platform 10 and an applicator holder 12 as shown in FIG. 3. In reference to the general configuration of the present invention, the lid 1, the housing 7, and the base 9 are concentrically positioned along the central axis 17 so that the lid 1 and the base 9 can be oppositely positioned of each other about the housing 7. The applicator holder 12 functions as the storage space for the roller-type applicator and concentrically connected onto the platform 10. As a result, the platform 10 is able to threadedly attach to the housing 7 as the applicator holder 12 is encircled by the housing 7. The lid 1 that provides an opening for the roller-type applicator to be inserted into the applicator holder 12 is threadedly attached to the housing 7. The water inlet valve 8 that provide a flow of water from a water outlet is laterally mounted onto the housing 7. The plurality of radial openings 16 that redirects the flow of water into the stored roller-type applicator laterally traverses through the applicator holder 12. Resultantly, the water inlet valve 8 is in fluid communication with the plurality of radial openings 16.

Figure 4:
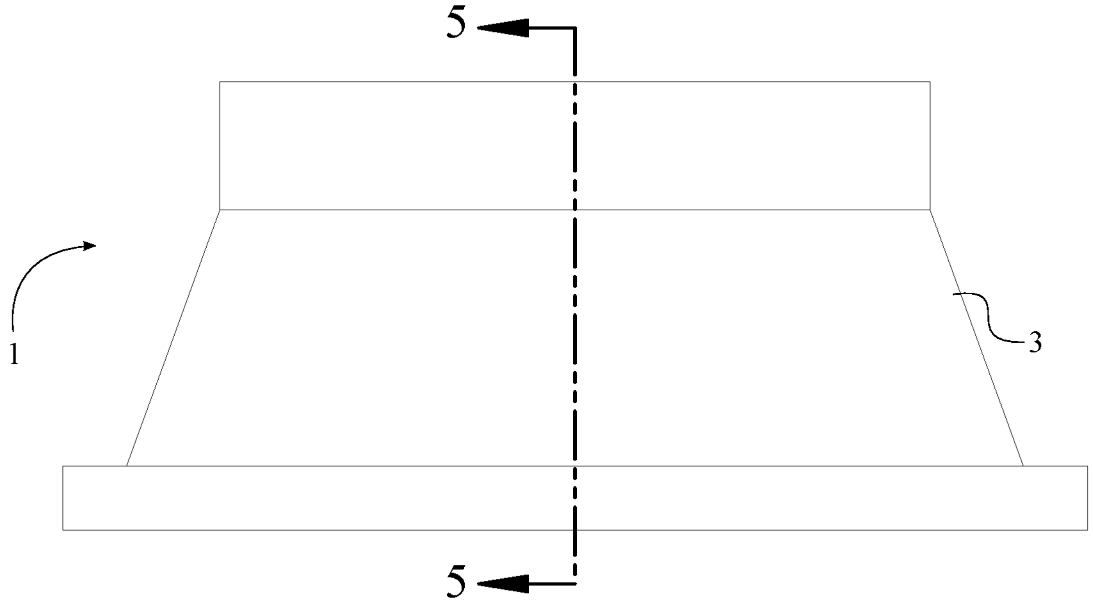
FIG. 4 is a side view of the lid of the present invention, showing the plane upon which a cross sectional view is taken shown in FIG. 5.
Figure 5:
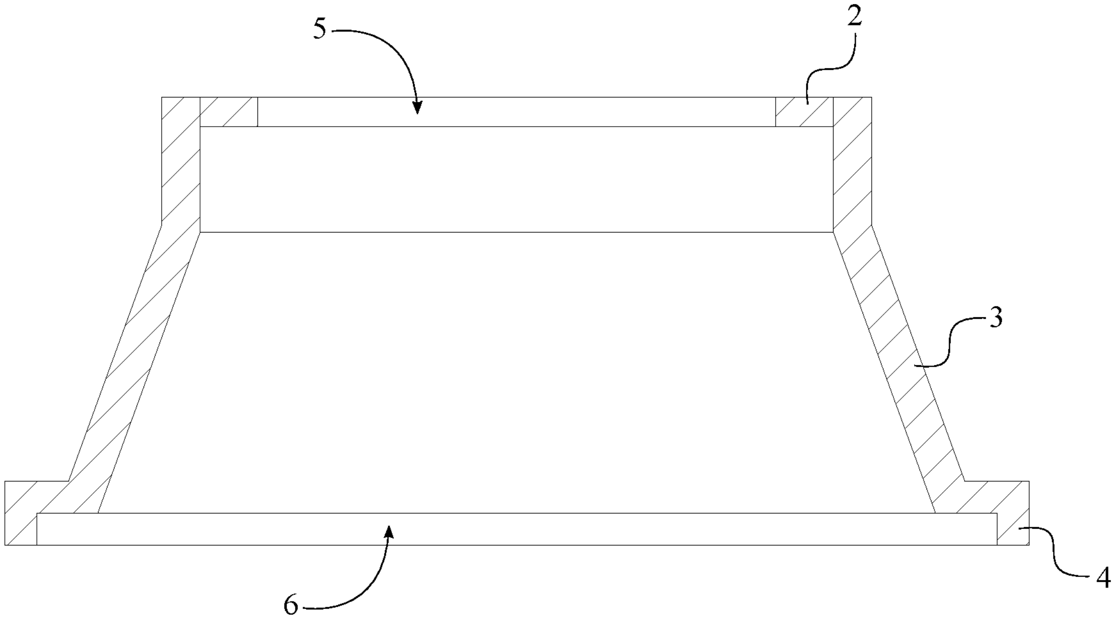
FIG. 5 is a cross section view of the lid of the present invention.

In reference to FIG. 4-5, the lid 1 that provides an opening for the roller-type applicator to be inserted comprises an inner rim 2, a lateral wall 3, and a top connector lip 4. Furthermore, the lid 1 also functions as a foundation to rest the roller-type applicator above the present invention so that the user does not have to physically hold the roller-type applicator. More specifically, the inner rim 2 and the top connector lip 4 are oppositely positioned of each other about the lateral wall 3 thus delineating the overall shape of the lid 1. The inner rim 2 is perpendicularly positioned to the top connector lip 4 so that each component is able to provide a functionality to the present invention. More specifically, the inner rim 2 is perimetrically connected within the lateral wall 3 so that the handle of the roller-type applicator can be placed upon the inner rim 2. The top connector lip 4 is perimetrically connected to the lateral wall 3, wherein the top connector lip 4 facilitates the threaded connection between the lid 1 and the housing 7.

The present invention further comprises a first opening 5 and a second opening 6 as shown in FIG. 5. More specifically, the first opening 5 is delineated by the lateral wall 3 and the inner rim 2. The second opening 6 is delineated by the lateral wall 3 and the top connector lip 4. The first opening 5 is concentrically positioned to the second opening 6 so that the roller-type applicator can be inserted through the lid 1. In other words, the lid 1 is generally shaped into a tapered cylindrical body wherein a diameter of the first opening 5 is smaller than a diameter of the second opening 6. Once the lid 1 is attached to the housing 7, the applicator holder 12 is hermetically pressed against the inner rim 2 as the top connector lip 4 is threadedly attached around the housing 7.

Optionally, the connection point between the lid 1 and the housing 7 may comprise a top gasket to prevent of leakage of water during the cleaning process of the roller-type applicator. For example, the top gasket can be perimetrically connected around a top end of the housing 7 thus allowing sufficient surface area to attach the lid 1 to the housing 7. However, the top gasket can also be perimetrically integrated into the top connector lip 4 to facilitate the same functionality.

The present invention further comprises a bottom connector lip 11 as shown in FIG. 3. More specifically, the bottom connector lip 11 is perimetrically connected to the platform 10 and orients towards the applicator holder 12. When the base 9 is threadedly attached to the housing 7, the platform 10 is hermetically pressed against the housing 7 as the bottom connector lip 11 is threadedly attached around the housing 7.

Optionally, the connection point between the base 9 and the housing 7 may comprise a bottom gasket to prevent of leakage of water during the cleaning process of the roller-type applicator. For example, the bottom gasket can be perimetrically connected around a bottom end of the housing 7 thus allowing sufficient surface area to attach the bottom connector lip 11 to the housing 7. However, the bottom gasket can also be perimetrically integrated into the bottom connector lip 11 to facilitate the same functionality.

Figure 6:
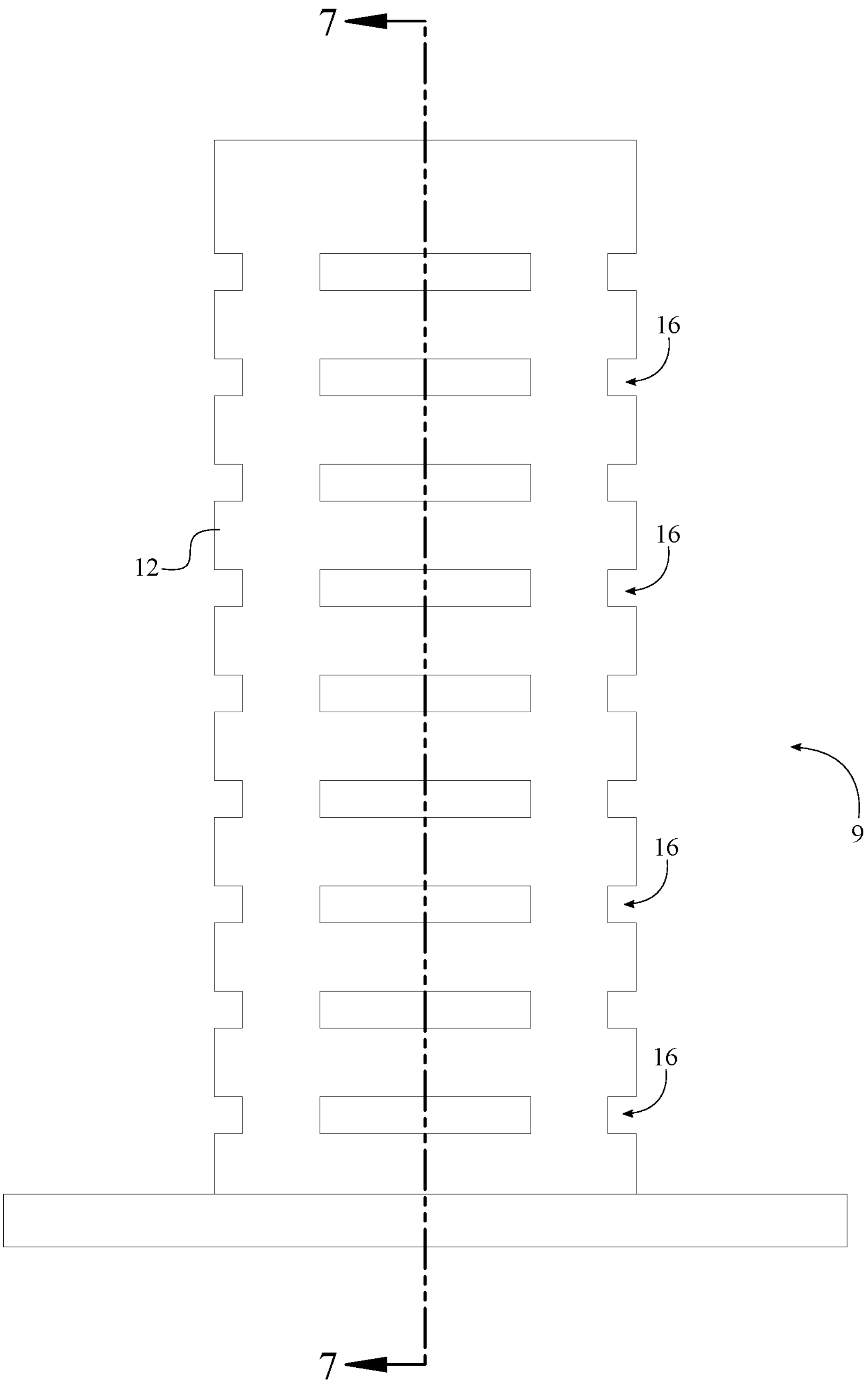
FIG. 6 is a side view of the lid of the present invention, showing the plane upon which a cross sectional view is taken shown in FIG. 7.
Figure 7:
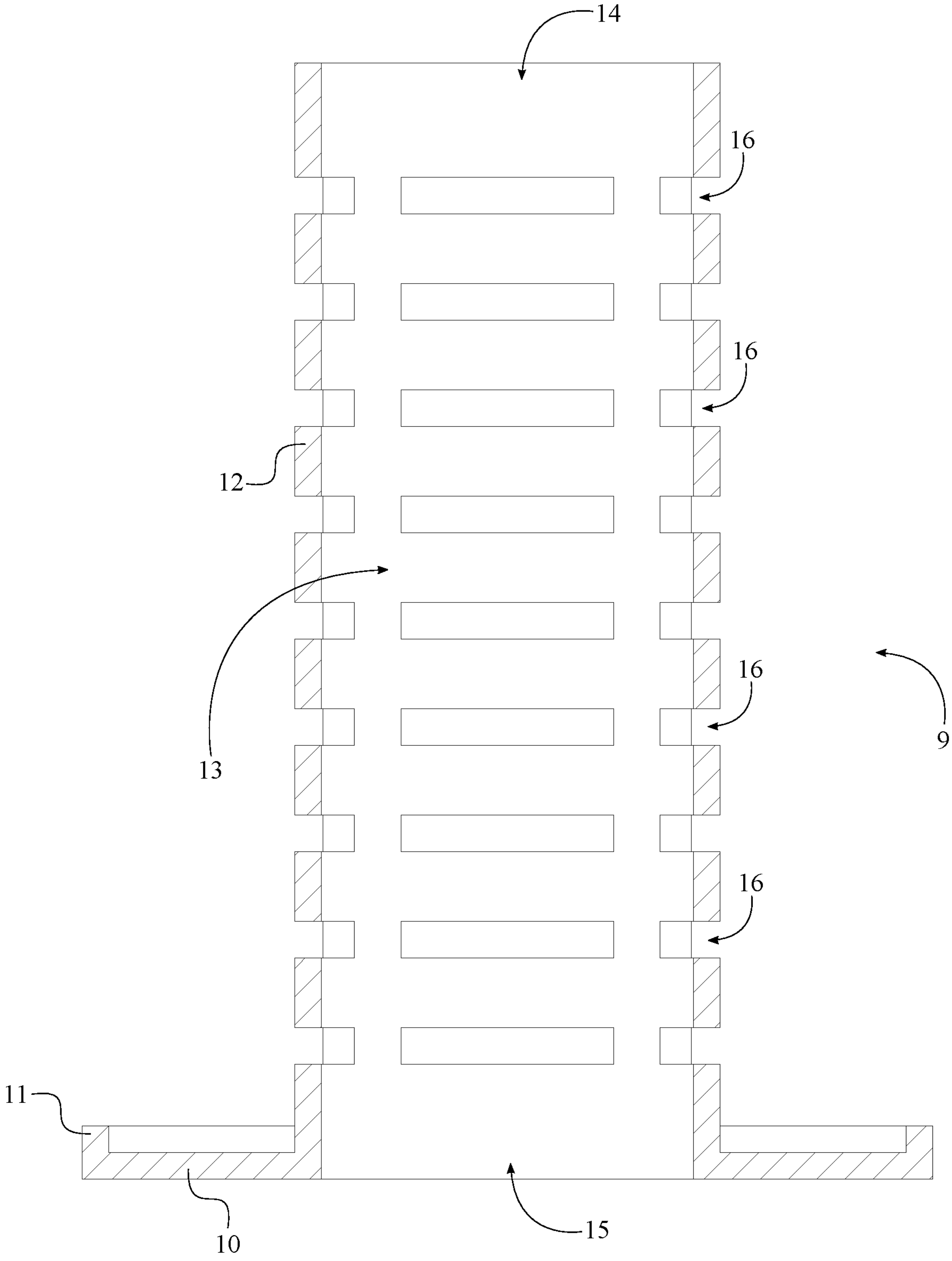
FIG. 7 is a cross section view of the lid of the present invention.

The present invention further comprises a channel 13 as shown in FIG. 6-7. More specifically, the channel 13 provides an empty space within the applicator holder 12 so that the roller-type applicator can be stored within the present invention. The channel 13 concentrically traverses along the applicator holder 12 and the platform 10 forming a tubular profile for the base 9. Furthermore, a third opening 14 of the present invention is delineated within the applicator holder 12 and terminally positioned to the channel 13. A fourth opening 15 of the present invention delineated within the platform 10 and terminally positioned to the channel 13. The third opening 14 is concentrically positioned to the fourth opening 15 so that the roller-type applicator can be vertically positioned within the applicator holder 12. When the base 9 is threadedly attached to the housing 7, the third opening 14 is adjacently positioned to the first opening 5 thus allowing the applicator holder 12 to fully extend from the platform 10 to the lid 1. Furthermore, a diameter of the third opening 14 is equal to the diameter of the first opening 5 and a diameter of the fourth opening 15 is equal to the diameter of the third opening 14.

It is preferred that the water inlet valve 8 be located on an outer surfaces of the housing 7 so that the water inlet valve 8 can be compatible with garden hose, faucet, or other similarly related water outlet sources. The water inlet valve 8 can further comprise a shut-off lever that can be easily accessible to the user. The shut-off lever functions as a mechanical apparatus to cut off the flow of water to the present invention, as needed. Once the flow of water is discharged into the housing 7 through the connection of the water outlet source and the activation of the shut-off lever, the flow of water can be redirected into the channel 13 through the plurality of radial openings 16. More specifically, the plurality of radial openings 16 laterally traversing into the channel 13 through the applicator holder 12. In order for the flow of water to be fully engaged with the roller-type applicator, each of the plurality of radial openings 16 is equally spaced along the applicator holder 12 so that the roller-type applicator can be fully covered with the flow of water. Once the flow of water enters into the channel 13 and cleans the roller-type applicator, the excess gray water is discharged through the fourth opening 15 due to gravitational force.

Although the invention has been explained in relation to its preferred embodiment, it is to be understood that many other possible modifications and variations can be made without departing from the spirit and scope of the invention as hereinafter claimed.

What is claimed is:

1. A roller-type applicator cleaning apparatus comprising:
- a lid;
- a housing;
- a water inlet valve;
- a base;
- a plurality of radial openings;
- a central axis;
- the base comprising a platform and an applicator holder;
- the lid, the housing, and the base being concentrically positioned along the central axis;
- the lid comprising an inner rim, a lateral wall, and a top connector lip;
- the applicator holder being concentrically connected onto the platform;
- the applicator holder having an imperforate surface;
- the imperforate surface of the applicator holder being hermetically pressed against the inner rim;
- the lid and the base oppositely positioned of each other about the housing;
- the lid being threadedly attached to the housing;
- a first opening;
- a second opening;
- the first opening being delineated by the lateral wall and the inner rim;
- the second opening being delineated by the lateral wall and the top connector lip;
- the first opening being concentrically positioned to the second opening; and
- the platform being hermetically pressed against the housing;
- a third opening;
- a fourth opening;
- the third opening being adjacently positioned to the first opening;
- a diameter of the first opening being smaller than a diameter of the second opening;

a diameter of the third opening being equal to the diameter of the first opening; and a diameter of the fourth opening being equal to the diameter of the third opening.

2. A roller-type applicator cleaning apparatus as claimed in claim 1 comprising:

the water inlet valve being laterally mounted onto the housing; and the plurality of radial openings laterally traversing through the applicator holder.

3. A roller-type applicator cleaning apparatus as claimed in claim 1 comprising:

a bottom connector lip;

the bottom connector lip being perimetrically connected to the platform; and the bottom connector lip being threadedly attached around the housing.

4. A roller-type applicator cleaning apparatus as claimed in claim 1 comprising:

the platform being threadedly attached to the housing;

the applicator holder being encircled by the housing; and the water inlet valve being in fluid communication with the plurality of radial openings.

5. A roller-type applicator cleaning apparatus as claimed in claim 1 comprising:

the inner rim and the top connector lip being oppositely positioned of each other about the lateral wall;

the inner rim being perpendicularly positioned to the top connector lip;

the inner rim being perimetrically connected within the lateral wall; and the top connector lip being perimetrically connected to the lateral wall.

6. The roller-type applicator cleaning apparatus as claimed in claim 1 comprising:

a channel;

the channel concentrically traversing along the applicator holder and the platform; and the plurality of radial openings laterally traversing into the channel through the applicator holder.

7. The roller-type applicator cleaning apparatus as claimed in claim 5, wherein each of the plurality of radial openings being equally spaced along the applicator holder.

8. The roller-type applicator cleaning apparatus as claimed in claim 5 comprising:

the third opening being delineated within the applicator holder;

the fourth opening being delineated within the platform; and the third opening being concentrically positioned to the fourth opening.

* * * * *